Dec. 10, 1940.  P. F. SCOFIELD  2,224,450
LOW VELOCITY NOZZLE
Filed Oct. 31, 1938
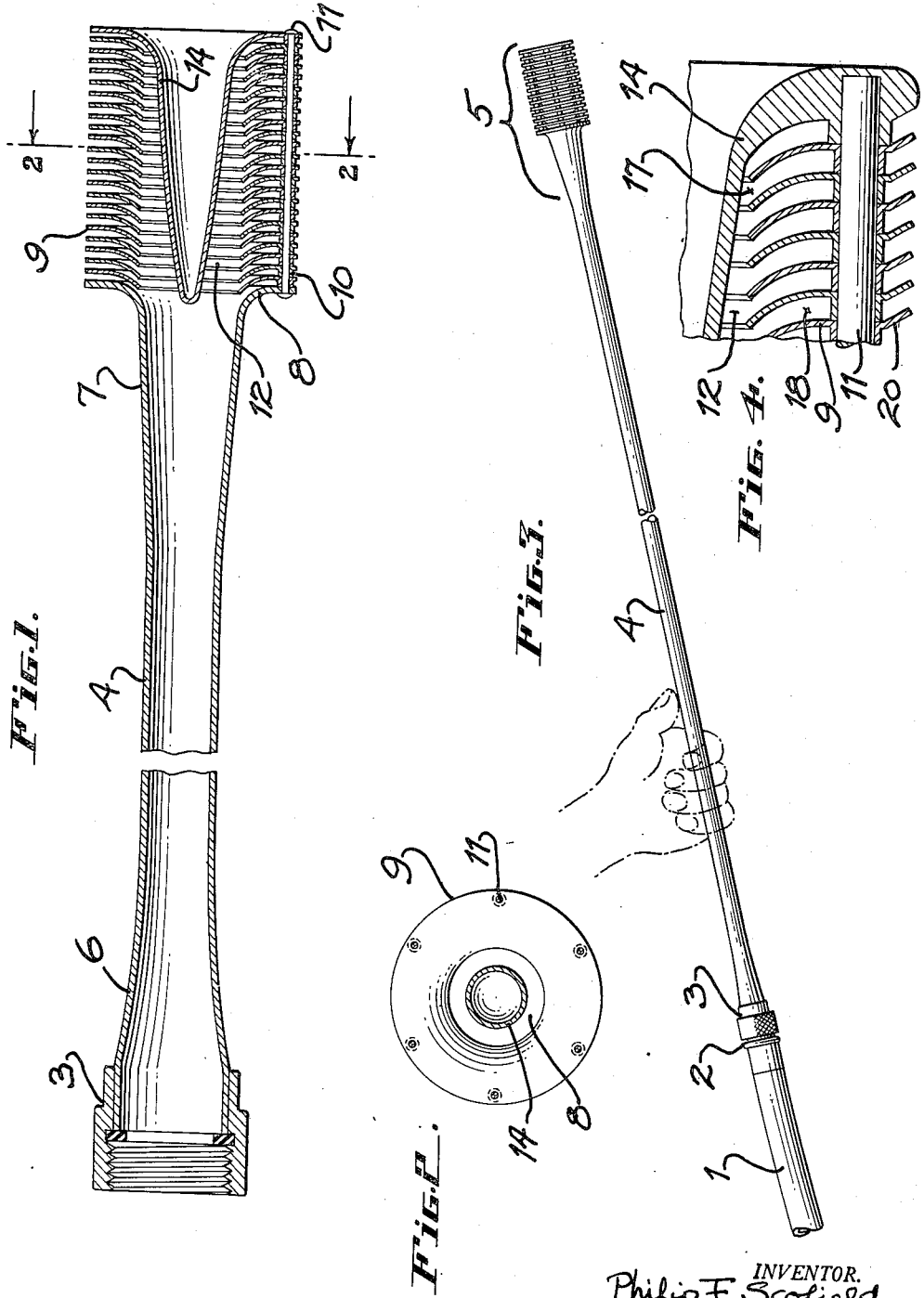
INVENTOR.
Philip F. Scofield
BY
Lippincott & Metcalf
ATTORNEYS.

Patented Dec. 10, 1940

2,224,450

UNITED STATES PATENT OFFICE 2,224,450

LOW VELOCITY NOZZLE

Philip F. Scofield, Palo Alto, Calif.

Application October 31, 1938, Serial No. 237,968

5 Claims. (Cl. 299—141)

My invention relates to low velocity nozzles, and more particularly to a nozzle which is adapted for use with a garden hose, to the end that large quantities of water may be supplied at a low velocity insufficient to cause substantial wash of dirt.

Among the objects of my invention are: to provide a velocity reducing nozzle for liquids discharging from conduits into the atmosphere; to provide a unitary velocity reducing nozzle having an inflexible length of light weight conduit; to provide such a nozzle wherein the water weight is reduced to a minimum; and to provide a nozzle for a hose or similar conduit, wherein the velocity of the issuing fluid is sufficiently small to prevent any substantial washing of dirt or similar material on which the fluid falls.

My invention possesses numerous other objects and features of advantage, some of which, together with the foregoing, will be set forth in the following description of specific apparatus embodying and utilizing my novel method. It is therefore to be understood that my mehod is applicable to other apparatus, and that I do not limit myself, in any way, to the apparatus of the present application, as I may adopt various other apparatus embodiments, utilizing the method, within the scope of the appended claims.

Inasmuch as one of the more popular uses of my invention is in combination with the ordinary garden hose utilized for watering plants in gardens or pots, I prefer to describe my invention as applied to that particular embodiment, although it will be obvious to those skilled in the art that the inherent advantages of my invention may be applied to any use of fluid wherein a low issuing velocity is desired.

Referring to the drawing:

Fig. 1 is a longitudinal sectional view of a watering nozzle embodying my invention.

Fig. 2 is a view in elevation, taken as indicated by the line 2—2 in Fig. 1.

Fig. 3 is an elevational view, showing my invention as applied to a flexible garden hose and held in the hand.

Fig. 4 is a sectional view of a portion of my invention, showing an alternative method of assembling the device.

Considering my invention as applied to the ordinary garden hose, usually of three-quarter inch diameter canvas-rubber flexible hose, it has been found that the issuing velocity of the water, even with a relatively low flow, will be approximately four feet per second or higher, in accordance with the pressure, which may vary from forty to sixty pounds per square inch in domestic water systems.

I have also found that as more water passes through the hose, the greater the issuing velocity will be. I have discovered, however, that it is highly desirable that the issuing velocity of the water shall not be substantially over one and one-half feet per second if wash of dirt is to be avoided. Consequently, there exists in the use of the garden hose, with or without nozzles, the condition that the issuing velocity rises with the increase in volume of water issuing into the atmosphere, and that if a velocity of one and one-half feet per second is to be obtained with the ordinary open nozzle, then the amount of water must be reduced to a value that will be insufficient for practical use. Therefore, my invention is directed toward the reduction of velocity in the issuing water to less than one and one-half feet per second, with a simultaneous relatively high volume.

My invention also includes as a separate aspect thereof the use of an inflexible length of conduit between the issuing water and the flexible hose, in order that this length may be held in the hand and distant portions of a flower bed, for example, provided with water by manipulation of the hand and arm of the user.

It will be obvious, however, that such a length of conduit will have, not only its own weight, but also that of the water contained in the conduit during use. Consequently, in order to reduce the weight of the inflexible portion during use, I may prefer to step up the velocity of the water in the inflexible portion and reduce it again just prior to the issuance of the water into the atmosphere, thereby reducing the total weight of the device during use.

Referring directly to the drawing for a better understanding of my invention, a flexible garden hose 1 is provided with the usual male end 2 which can be coupled to a female end 3 on the end of an inflexible hand conduit 4. The length of this inflexible portion may, of course, be varied in accordance with requirements, but I have found that lengths of from three to six feet enable the user of the device to reach distant corners of a flower bed or garden without difficulty.

At the other end of the hand conduit 4 I provide a pressure reducing nozzle 5, the details of which are shown in Figs. 1 and 2. In order, however, to save weight in the hand-held conduit 4, I reduce the diameter of the hand-held portion by the use of a taper 6 immediately adjacent female coupling 3. Thus, if the velocity in hose 1 is, for example, four feet per second, I prefer, by the use of taper 6, to step up the velocity in the main extent of hand conduit 4 to, for example, ten feet per second, thus providing for a flow of water through the hand conduit 4 equal to the flow in hose 1 but with a higher velocity. The small diameter of the conduit greatly reduces the weight of the device when filled with water.

As the hand conduit approaches the pressure reducing nozzle 5, an expanding taper 7 is provided, which is for the purpose of reducing the velocity. Following the velocity examples already given, I prefer to reduce the flow to substantially three feet per second at the widest portion of the taper. A flare 8 is provided at the large end of the taper, which supports a series of spaced, annular and curved distributing washers 9, which are maintained in spaced relation by integral spacers 10 mounted on longitudinal studs 11. All distributing washers have the same curve and are equally spaced, the curve of each washer being toward the moving water. A central water flow chamber 12 is provided by the inner edges of the washers, and this inner chamber is regulated as to relative size by an end cone 14 projecting into chamber 12 and extending slightly into the open end of taper 7. Cone 14 is also mounted on studs 11 and forms the end of the pressure reducing nozzle. The taper of cone 14 is so proportioned that the cross-sectional area of chamber 12 reduces in accordance with the length of the washer assembly, thereby providing a substantially uniform velocity in all parts of chamber 12 as the water starts to pass between the washers, and the amount of outlet area provided, due to the increase in diameter of the washers, is sufficient to still further reduce the velocity of the water passing between the washers to less than one and one-half feet per second, following the numerical examples of velocities previously given.

In Fig. 4 I have shown an alternative construction wherein the annular distributing washers 9 are provided with an inner curvature, such that they do not maintain parallel relationship but bend toward each other so that the inner spacing 17 is slightly smaller than the intermediate spacing 18. This slight narrowing of the paths surrounding the inner chamber 12 helps to provide a uniform pressure within chamber 12 and also aids in preventing cavitation, or the entrance of air into the central chamber 12, while the water is running therethrough.

Likewise, I have found it advantageous in some cases to form the outer edge of each washer with an angular lip 20 so that the outgoing water will be projected with a slight forward motion. In this modification I have shown cone 14 being of diecast construction rather than as a drawn stamping, as shown in Fig. 1. It will be obvious, however, that the results are identical.

Thus, it will be seen that I have provided, first, a nozzle opening into the atmosphere which allows water to be vented at a velocity of less than one and one-half feet per second. With the use of an ordinary three-quarter inch garden hose, at a pressure of from forty to sixty pounds, I have found that it is possible to release, at the velocity of less than one and one-half feet per second, from ten to fifteen gallons of water per minute. Thus, a flower bed, for example, can be provided with water at a velocity less than that capable of providing any appreciable wash of dirt, in less than one-half the time that the bed could be watered with the ordinary hose, even with an open nozzle, because of the fact that the velocity from the open nozzle would be too high to control at that volume of water.

It will be obvious, however, that while I have described my invention in conjunction with the hand-held conduit 4, that this portion of my invention is mainly for convenience in getting to distant portions of a flower bed, and that in other forms my invention may have the small end of taper 7 attached directly to the hose, if desired.

It will be obvious also that with the extremely low velocity attained by the water in passing through the nozzle of my invention, that the nozzle may be laid directly on the ground while the water is flowing therethrough without any substantial wash of dirt during the flow.

I have found that for most consistent results the taper 7 may be within the range of from seven and one-half degrees to ten degrees, and this taper may be, if desired, different from taper 6 in accordance with the diameter of hand-held conduit 4 it is desired to utilize.

I am aware that there have been attempts to make velocity reducing nozzles before my invention, but in every case such nozzles apparently depend upon multiple outlets alone without consideration of gradual and precisely controlled pressure reduction of the fluid before reaching the outlets.

I claim:

1. A terminal velocity reducing nozzle for a conduit carrying liquids, comprising a plurality of spaced identical washers having apertures therein, the edges of said apertures defining a liquid chamber with an inlet at one end and a closure plate at the other end thereof, said washers having outer parallel portions, the inner portions of said washers being curved toward the direction of flow in said chamber, said curvature being proportioned to provide closest spacing between said washers along a line normal to the curvature of a washer and passing through the edge defining the aperture in the next adjacent washer.

2. Apparatus in accordance with claim 1 wherein the outer parallel portions of the washers are positioned substantially at right angles to the general direction of flow within the liquid chamber.

3. Apparatus in accordance with claim 1 wherein said washers have a reverse curvature near the outer periphery thereof to direct the outflowing liquid in the general direction of flow within the nozzle.

4. A velocity reducing device for attachment to a hose, comprising a hose coupling, a rigid liquid conduit attached to said coupling and having a decreasing taper in direction of flow, said conduit having a body portion of lesser diameter than said hose, said conduit thereafter expanding to terminate in a velocity reducing nozzle as recited in claim 1, the cross-sectional area of said termination being greater than the body portion of said conduit.

5. A velocity reducing device for attachment to a hose, comprising a hose coupling, a tube attached to said coupling and having a decreasing taper in direction of flow, said tube having a body portion of lesser diameter than said hose, said tube having a terminal increasing taper the termination of which has a large diameter greater than the diameter of said hose, and a liquid exit nozzle attached to the large end of said latter taper and flow directing means relatively positioned to provide a plurality of expanding liquid flow paths to the atmosphere.

PHILIP F. SCOFIELD.